Oct. 13, 1931.                C. L. IPSEN                1,827,657
                          ELECTRIC ARC WELDING
                          Filed Aug. 2, 1926
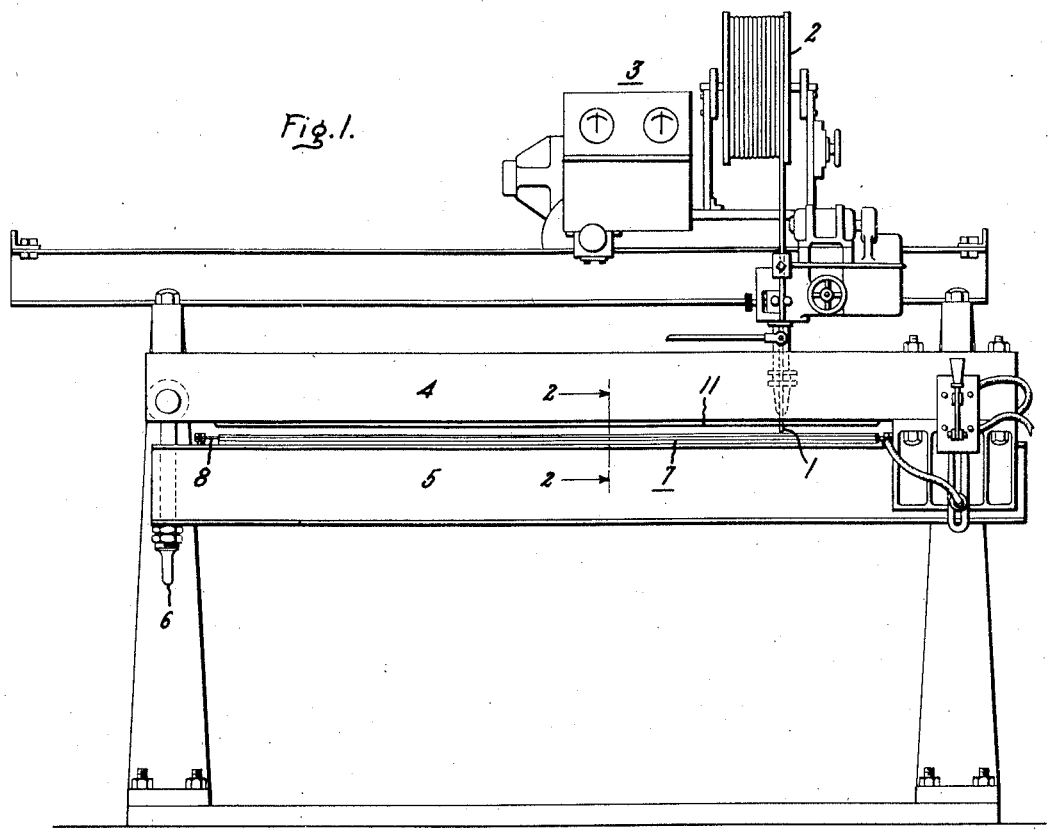
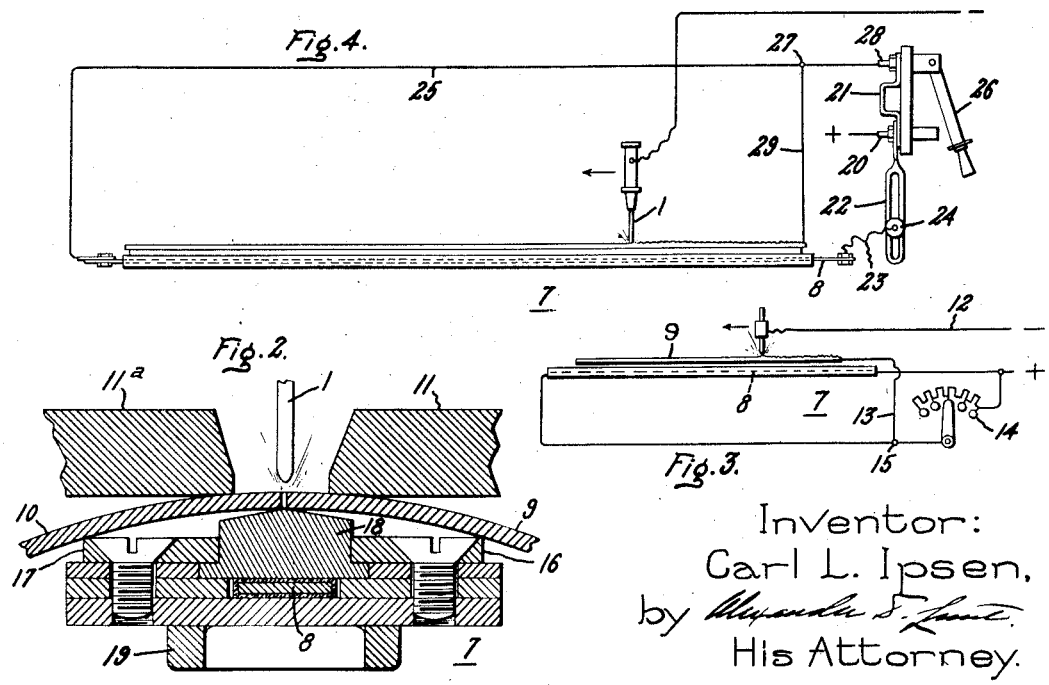
Inventor:
Carl L. Ipsen,
by *Alexander S. [illegible]*
His Attorney.

Patented Oct. 13, 1931

1,827,657

UNITED STATES PATENT OFFICE

CARL L. IPSEN, OF SCHENECTADY, NEW YORK, ASSIGNOR TO GENERAL ELECTRIC COMPANY, A CORPORATION OF NEW YORK

ELECTRIC ARC WELDING

Application filed August 2, 1926. Serial No. 126,395.

My invention relates to electric arc welding, and more particularly to means for controlling the action of the arc. In its preferred form it relates to that type of arc welding wherein the arc is maintained between a welding pencil or electrode and the work, and wherein means are provided for producing relative movement between the electrode and the work along the line of the joint to be welded.

An object of my invention is to provide an improved arrangement for magnetically controlling the arc, and a further object is to provide a simple, rugged and reliable backing bar construction which includes means adapted magnetically to control the position of the arc.

In electric arc welding where the work constitutes one electrode, and the welding pencil the other electrode, the welding current produces stray magnetic fields which due to the presence of the magnetic material of the work or its supporting means are of varying strength and position. Also as a result of previous welding operations the frame members of the welding machine become magnetized and the fields thus produced are likewise of varying strength and position. The arc stream in the presence of these fields is deflected in varying amounts and in various directions, causing the arc to become unsteady and to wander about, and at times to be actually blown out or extinguished. It is desirable to have the arc deflected in the direction of its travel or movement along the seam to be welded, or in other words, to be deflected toward the unwelded portion of the seam. It has been proposed to secure this forward deflection of the arc by causing the current to flow through the work to be welded in such a way that the partial loop in the circuit comprising the current path through the work and through the electrode, produces a field back of the arc so as to direct the arc forwardly; for example, the source or so-called ground connection has been made to the work at the end of the seam where welding is begun. But this method depends for its success on the current traveling from this point to the arc in a direct path. Where the current is led into the work by the work-supporting means or by members clamped to the work, the point at which the current enters the work is uncertain, due to the fact that the current tends to flow through the path of least resistance, and the resistance depends upon the closeness of the clamping, the dirt and scale on the work and clamping means, and the like. From the point or points at which the current enters the work, the path of the current is again variable through the work since the current here again seeks the path of least resistance, moreover, the current path through the work continually changes as the welding proceeds. Consequently, the arc is deflected in varying directions and amounts because the direction and value of the magnetic field are thus continually changing, depending upon the path of the current flow and the difference in magnetic reluctance for the different current paths.

In accordance with my invention, I provide means for establishing a magnetic field of the proper magnitude and direction to exert a correct influence on the arc throughout the welding operation.

My invention will be better understood from the following description taken in connection with the accompanying drawings, and its scope will be pointed out in the appended claims.

In the drawings, Fig. 1 represents a welding machine embodying my invention; Fig. 2 represents a section of this machine along the lines 2—2 of Fig. 1; Fig. 3 represents diagrammatically an embodiment of my invention; and Fig. 4 represents a modification thereof.

In Fig. 1 my invention is shown applied to an automatic metallic arc welding machine of a type, examples of which are now well known in the art. In the arrangement shown, the electrode 1 is represented as drawn from a reel 2 and fed toward the work to be welded by suitable mechanism mounted on a welding head 3. In the arrangement illustrated, the welding head is represented as arranged to move with reference to the work. The work is arranged to be mounted between suitable supporting means comprising members 4 and 5, which are secured at one end to the frame of the machine. The other ends of these members may be held together by the swinging bolt 6 after the work has been inserted and before it is clamped in place in the machine. The work (not shown in Fig. 1) is supported on a backing bar 7 which embodies my invention. This backing bar comprises a conductor 8 extending along the same and insulated therefrom. In accordance with my invention, current through this conductor 8 produces a magnetic field along the line of the seam to be welded, which extends across the seam, the direction of current through the conductor 8 being such that the arc between the electrode 1 and the work is deflected in the direction in which the welding head is moved with reference to the work. The principle of operation will be explained in connection with Fig. 3, and one structural embodiment of the invention will be explained in connection with Fig. 2. It is to be understood that it is immaterial, as far as my invention is concerned, whether the work is stationary and the welding head movable, as in Fig. 1, or whether the welding head is stationary and the work made movable under the welding head. It is also to be understood that my invention is not limited to any particular construction of work holder or clamping means, or to any particular construction of welding head, suitable examples of work-clamping means and automatic welding heads being well known.

Referring now to Fig. 2, the work is represented as a pair of curved plates 9 and 10, the joint between which is to be welded. The work is clamped between the backing bar 7, shown below the plates, and a pair of clamping members 11 and 11a, which may be mounted on the members 4 of Fig. 1. The backing bar 7, as shown in Fig. 2, embodies the conductor 8 in its construction. Before describing the particular construction of the backing bar shown in Fig. 2, Fig. 3 will be described.

Referring to Fig. 3, the electrode 1 is indicated as connected by the lead 12 to one side of a suitable welding circuit, in this case represented as a direct current circuit in which the lead 12 is preferably connected to the negative side of the circuit. The work 9, or the support therefor, is connected by a lead 13 to the other side of the welding circuit. In the arrangement shown in Fig. 3, the connection from the lead 13 to the positive side of the circuit leads through an adjustable resistance 14. The conductor 8 extending along the backing bar 7 is shunted across the resistance 14 in Fig. 3, so that conductor 8 is in series relation with the arc. The current from the positive side of the source flows in parallel circuits through the resistance 14 and the conductor 8 to the point 15, and thence into the work and through the arc to the electrode 1, and back by the lead 12 to the negative side of the source. The flow of current through the conductor 8 produces a magnetic field surrounding this conductor, in which field the arc is maintained. To simplify the showing in Fig. 3, the mechanism for producing relative movement between the electrode and the work along the line of the joint to be welded, is omitted, but the arrow adjacent the electrode indicates that the seam in the work is being welded from right to left. The magnetic field produced by the conductor 8 is, therefore, in a direction to deflect the arc from right to left. It would be understood that if welding is to be done in the other direction, for example, from left to right in Fig. 3, the current will be led through the conductor 8 in the other direction where the work is connected to the positive side of the circuit and the electrode to the negative side of the circuit, as shown. It will also be understood that where successive welds are to be made in opposite directions suitable switching means may be provided for manually or automatically reversing the direction of current flow in the conductor 8.

While in Fig. 3 the lead 13 appears to be connected to one end of the work 10, it is to be understood that this connection is not necessarily so made, since, in accordance with my invention, it is immaterial where or how the current is led into the work. The conductor 13 may lead to either end of the work or to some part of the supporting devices which are in contact with the work. One convenient way of leading current into the work is to secure the conductor 13 to some part of the frame which is in electrical contact with the clamping members 11 and 11a. The reason why it is immaterial where the current enters the work is that the magnetic field produced by the conductor 8 below the work is the field which controls the arc, and this field overcomes objectionable effects from stray fields. Means are provided from controlling the magnitude of the field produced by conductor 8, and, as illustrated in Fig. 3, this means comprises the rheostat 14, which may be adjusted so that all of the welding current or any desired proportion thereof may be sent through the conductor 8. The amount of field required depends upon the particular construction of the machine to which my invention is applied, and the particular work being welded. In many cases, from twenty-five to fifty per cent. of the welding current led through a single conductor in the backing bar provides a sufficiently strong field for the purpose desired. While in Fig. 3 the conductor 8 is shown in series relation with the work, it is to be understood that the current through this conductor may be provided from any suitable sources; for example, the current may be supplied from a constant potential source independent of the arc. It is also to be understood that it is immaterial, as far as my invention is concerned, whether the backing bar comprises a single conductor 8 or a plurality of conductors through which the current is led in series or parallel. Where a plurality of conductors connected in series or provided, the arrangement comprises a flat coil, one side of which is along the line of the joint and under the work. I find, however, that a single conductor provides a sufficiently strong field for the purpose described, and the comparatively large current required for such construction is simply and economically obtained by connecting the conductor in series relation with the arc.

My invention is not limited to any particular construction of backing bar, nor is it limited to an arrangement wherein the conductor extending along the backing bar is embodied therein, but I at present prefer to insulate the conductor and embody it in the backing-bar construction for purposes of simplicity, compactness, and ruggedness.

It is apparent that it is immaterial whether the plates to be welded are curved or flat. The arrangement shown in Fig. 2 is particularly adapted for welding curved plates. This construction, without the magnetic field producing conductor embodied therein, forms the subject-matter of a copending application of Verni J. Chapman, Serial No. 126,709, for welding machine, filed August 2, 1926, and assigned to the same assignee as the present application.

The backing bar 7, shown in Fig. 2, forms with members 11 and 11a the work engaging parts of the work clamping mechanism of the machine shown in Fig. 1. The backing bar 7 is mounted within the member 5 of this machine in any suitable manner whereby it may be forced against the work to clamp it against the stationary clamping members 11 and 11a, which are mounted on the members 4 of this machine. The backing member, for example, may be flexible and supported upon a hose extending along the member 5 immediately under the line of the weld, as described and claimed in Letters Patent No. 1,640,437 granted August 30, 1927 on an application, Serial No. 9403, of Verni J. Chapman, for electric welding, filed February 16, 1925, and assigned to the same assignee as the present application. This backing member, it will be noted by a reference to Fig. 2, has parts 16 and 17 which engage the work on each side of the seam and cooperate with the holding members 11 and 11a, which engage the other surface of the work at points nearer the seam in such a manner as to produce bending moments in the work at the seam which forces the edges of the work into intimate contact with the backing strip, or "chill" bar 18. This backing strip is made of some non-magnetic material such as copper, to which the weld metal will not readily adhere, and its work engaging surface is so shaped that it makes contact with the work at the seam along an area of restricted width thereby to insure a firm engagement of the work with the strip as a result of the bending forces set up in the work. The construction of the strip 18 will vary for different kinds of work. For thin work, the strip will be so designed as to afford a narrow work-engaging portion, while for heavier work a wider area of contact may be desirable. For some types of heavy work it may prove desirable to groove the work-engaging portion that lies immediately beneath the seam so that during welding a reinforcing strip of the weld metal may be formed on the under side of the work. The conductor 8, previously described, is shown as located immediately beneath the backing strip 18 and insulated therefrom so that it is in non-conductive relation with the work over the length of the seam. The backing member 7, with the exception of the strip 18, and the conductor 8 is of magnetic material and forms with the work parts 9 and 10, if these be of magnetic material, a magnetic circuit for directing the flux, produced by the current flowing in conductor 8, across the seam to be welded. A good magnetic path is thus provided below the conductor for this flux. It is apparent that the work-engaging parts 16 and 17 of the backing member 7 may be separated and distinct from that part which supports the strip 18, so long as they cooperate with the holding members 11, 11a to produce bending moments in the work that will force the edges of the work into intimate contact with the backing strip. In the illustrated embodiment, the parts are made integral and the arrangement is such that the parts 16 and 17 may be adjusted relatively to the strip 18. As thus arranged, the backing member may be used for work of any curvature, including flat work. The depending portion 19 of the backing member 7 is arranged to support that portion of the member at this section upon the means used to force the backing bar into engagement with the work to clamp it against the holding members 11 and 11a.

Fig. 4 illustrates more or less diagrammatically another embodiment of my invention. The positive terminal of the source of welding current is connected at 20 to a terminal of a fixed resistance 21 and also to a terminal of an adjustable resistance 22. The adjustable resistance 22 is shown as a slotted member to which a lead 23 connected to one end of the conductor 8 is attached by a nut and bolt 24. The nearness or remoteness of the connection at 24 to or from the terminal at 20 determines the amount of resistance furnished by the adjustable resistance 22 in the circuit including the conductor 8. The other end of conductor 8 is connected by a conductor 25 to the other terminal of the fixed resistance 21. This resistance 21 is adapted to be short circuited by a switch 26. If the switch is open, as illustrated, current then flows from 20 through the resistance 21 and the resistance 22, lead 23, conductor 8, and conductor 25 in parallel to the point 27, which may be coincident with the upper terminal 28 of the fixed resistance 21. From point 27, the current is led to the work by a conductor 29. In reality this connection is made to the frame of the machine and the current flows through the machine parts to the holding members 11 and 11a, and thence into the work. From the work, the current flows through the arc to the electrode 1 and thence to the negative terminal of the source of supply. As in Fig. 3 the magnetic field produced by the conductor 8 is in a direction to deflect the arc from right to left and the welding operation is performed in this direction. By closing the switch 26 and thereby shortening the resistance 21, the amount of current flowing through the conductor 8 is greatly reduced, due to the path of less resistance thus formed in shunt to it. In welding, it has been found desirable to shunt the current from the conductor 8 until the arc has been established and the weld has progressed a few inches along the seam. The field produced by the normal amount of current flowing through the bar 8 sometimes makes it difficult to strike the arc and for this reason the field strength is greatly decreased in value by shunting current from the conductor 8 until the arc has been established, after which it is restored to the condition found most desirable for welding. Instead of a switch 26 connected across the fixed resistance 21, a variable rheostat may be used. Under certain conditions the use of a rheostat is preferable since otherwise the sudden establishment of the field might disrupt the arc. Likewise the resistances 21 and 22 may be replaced by a single rheostat whose resistance element is connected to the circuit shown in Fig. 4 at points 24 and 28 and to which current is conducted through an adjustable contact member at a midpoint thereof.

The welding current in the circuit arrangement shown in Figs. 3 and 4 may be supplied from any suitable supply, such as a constant current source or an inherently regulated variable potential generator or a constant potential source of supply which furnishes current to the arc through a series stabilizing resistance. In the latter system, it is apparent that the current through the conductor 8 providing the controlling magnetic field may be secured by connecting the conductor in a circuit shunted across a portion of the stabilizing resistor.

While I have described my invention in connection with the welding of a seam or joint between plates, it is to be understood that the magnetic field controlling arrangement is also adapted to be used merely where a bead is deposited upon work which has no seam or joint. In this case, the current required for producing the magnetic field will usually be greater where the work is of magnetic material, since the work itself tends to provide a closed path for the lines of force to a considerably greater extent than where the joint is present.

While I have illustrated in Fig. 1 an arrangement for arc welding wherein a metallic electrode drawn from a reel is used, it is to be understood that my invention applies also where a carbon electrode, or a substantially non-consuming metallic electrode is used.

While I have referred specifically to direct current arc welding, wherein the work and the electrode are connected to opposite sides of the circuit, it is to be understood that alternating current may be used, since the current in the field-producing conductor 8 and in the arc reverse together and remain in phase when the conductor is in series with the arc.

It is also to be understood that my invention in its broader aspects extends to an arrangement wherein the arc is between a pair of electrodes instead of between an electrode and the work. In this case, however, the action of the magnetic field does not consist in deflecting the arc solely in the line of the joint to be welded, but tends to spread the arc, giving it a somewhat S-shaped form where the plane of the two electrodes is at right angles to the plane of the joint to be welded. Where the plane of the two electrodes coincides with the plane of the joint to be welded, the arc between the ends of the two electrodes will either be bowed up away from the work or bowed down toward the work, depending upon the direction in which the current is led through the magnetizing conductor 8. Where the arc between such a pair of electrodes is supplied from alternating current, and the magnetizing conductor 8 is also supplied from alternating current, the current through the magnetizing conductor should be substantially in phase with the current through the arc. Where the magnetizing conductor is energized from a direct current source, and alternating current is supplied to the pair of electrodes, the direction of the deflection of the arc during one half-cycle is the reverse of what it is during the next half-cycle. While my invention extends to such use of my magnetizing bar, I at present believe my invention will find its greatest field of utility in that type of system wherein the arc is between the electrode and the work.

While, in accordance with patent statutes, I have described certain embodiments of my invention, it will be apparent to those skilled in the art that changes and modifications may be made without departing from the scope of my invention, and I therefore aim in the appended claims to cover all such changes and modifications as fall within the true spirit and scope of my invention.

What I claim as new and desire to secure by Letters Patent of the United States is:—

1. An arc welding machine comprising means for traversing the arc and work relatively along the line of the seam to be welded, a substantially non-resistant conductor in non-conductive relation with the work over the length of the seam extending along the line of the seam and in proximity to the work, and means for energizing said conductor and for producing a magnetic field in front of and behind the arc directed across and extending along the seam in a direction to deflect the arc in the direction of its travel along the seam.

2. An arc welding machine comprising means for traversing the arc and work relatively along the line of the seam to be welded, a conductor extending along the line of the seam and in proximity to the work but out of conductive relation therewith along the length of the seam, connections adapted to cause a portion of the welding current to flow through said conductor, and means for controlling the amount of current that flows through said conductor.

3. In an arc welding machine means for traversing the arc and work relatively along the line of the seam to be welded and means for deflecting the arc in the direction of its travel along the work comprising work clamping means including a backing bar against which the work is clamped at the seam, a conductor extending along said bar, means for insulating said conductor from the work and said bar and means for energizing said conductor to produce a magnetic field directed across and extending along the seam.

4. Welding apparatus comprising means for traversing an arc and the work relatively along the line of the seam to be welded, work clamping means comprising a backing bar of magnetic material, a non-magnetic backing strip supported by said backing bar against which the work is clamped at the seam, and an insulated conductor extending along said backing bar and located beneath said backing strip, and means for causing an exciting current to flow through said insulated conductor to produce a magnetic field through said backing bar and the work adjacent the seam directed across and extending along the seam to deflect the arc in the direction of its travel along the seam.

5. Arc welding apparatus comprising a backing bar provided with a non-magnetic backing strip extending beneath the work, an insulated conductor located beneath said strip and a magnetic support for said strip arranged to provide a path around the lower side of said strip for flux produced by current in said conductor.

6. An automatic arc welding machine comprising means for traversing the arc and work relatively along the line of the seam to be welded; an insulated conductor extending along the line of the seam and in proximity to the work; means for energizing said conductor from the welding circuit comprising an adjustable resistance in series with said conductor, and a fixed resistance in shunt to said conductor and said variable resistance; and means for short-circuiting said fixed resistance thereby substantially to deenergize said conductor.

7. A backing bar for electric arc welding comprising a backing strip of non-magnetic material against which the work is adapted to be clamped, and a conductor insulated from the bar and extending along its length located beneath said backing strip.

8. A backing bar for electric arc welding comprising a backing strip of non-magnetic material against which the work is adapted to be clamped, a conductor insulated from the backing strip and extending along its length located beneath said backing strip, and means providing a magnetic path below said conductor for flux produced by current therein.

9. Arc welding apparatus comprising a non-magnetic strip for backing up the work along the line of welding, a conductor located beneath said strip and electrically insulated therefrom, and a magnetic support for said strip and said conductor having portions thereof on each side of said strip adapted to make engagement with the work to provide a path around said strip and said conductor and through the work immediately there above for flux produced by current in said conductor.

10. An arc welding machine comprising means for traversing the welding arc and work relatively along the line of welding, a conductor in non-conductive relation with the work extending along the line of welding in proximity to the work, a magnetic member adapted to engage the work on each side of the line of welding for enclosing said conductor between the work and itself in order to establish a magnetic circuit through said parts, and means for energizing said conductor to produce a magnetic field in the work directed across and extending along the line of welding to deflect the arc in the direction of its travel along the line of welding.

11. Arc welding apparatus comprising an electrical conductor, means for supporting said conductor in electrically non-conductive relation with the work along the line of welding, and a magnetic member adapted to engage the work on each side of the line of welding for establishing a path around said conductor and through the work along the line of welding for flux produced by current in said conductor.

12. An arc welding machine comprising means for traversing the arc and work relatively along the line of the seam to be welded, and means including a conductor in non-conductive relation with the work extending along the line of the seam and in proximity to the work for producing a magnetic field in front of and behind the arc extending along and directed across the seam in a direction to deflect the arc in the direction of its travel along the seam.

In witness whereof, I have hereunto set my hand this 30th day of July, 1926.

CARL L. IPSEN.